United States Patent
Ito et al.

(10) Patent No.: US 10,868,415 B2
(45) Date of Patent: Dec. 15, 2020

(54) EXTERIOR MEMBER OF ELECTRICAL WIRE

(71) Applicant: Yazaki Corporation, Tokyo (JP)

(72) Inventors: Yuto Ito, Utsunomiya (JP); Yohei Koseki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/247,690

(22) Filed: Jan. 15, 2019

(65) Prior Publication Data

US 2019/0222015 A1  Jul. 18, 2019

(30) Foreign Application Priority Data

Jan. 15, 2018  (JP) .................. 2018-004385

(51) Int. Cl.
| | | |
|---|---|---|
| B60R 16/02 | (2006.01) | |
| H02G 15/013 | (2006.01) | |
| H01B 3/30 | (2006.01) | |
| H02G 3/04 | (2006.01) | |

(52) U.S. Cl.
CPC ....... *H02G 15/013* (2013.01); *B60R 16/0215* (2013.01); *H01B 3/305* (2013.01); *H02G 3/0418* (2013.01); *H02G 3/0481* (2013.01)

(58) Field of Classification Search
CPC ............ H02G 15/013; H02G 3/0418; B60R 16/0215; H01B 3/305
USPC ........................................ 174/72 A
See application file for complete search history.

(56) References Cited

U.S. PATENT DOCUMENTS

| | | | |
|---|---|---|---|
| 9,302,635 B2 | 4/2016 | Han et al. | |
| 2003/0220067 A1 | 11/2003 | Mashiko et al. | |
| 2014/0216805 A1* | 8/2014 | Adachi ............... | H01B 7/182 |
| | | | 174/350 |
| 2015/0101842 A1* | 4/2015 | Han ................. | B60R 16/0222 |
| | | | 174/50.57 |
| 2017/0232913 A1* | 8/2017 | Fukazu .............. | B60K 1/02 |
| | | | 307/10.1 |
| 2019/0017676 A1* | 1/2019 | Van Straten ........ | F21S 41/141 |
| 2019/0135204 A1* | 5/2019 | Oohira ............... | H02G 3/06 |
| 2019/0267782 A1* | 8/2019 | Kushima ............ | H02G 15/013 |

FOREIGN PATENT DOCUMENTS

| | | |
|---|---|---|
| JP | 2009-029423 A | 2/2009 |
| JP | 2010-215010 A | 9/2010 |
| JP | 5737222 B2 | 6/2015 |

\* cited by examiner

*Primary Examiner* — Tremesha S Willis
(74) *Attorney, Agent, or Firm* — Banner & Witcoff, Ltd.

(57) ABSTRACT

An exterior member of an electrical wire includes a first tubular body and a second tubular body. The first tubular body includes a hollow portion through which the electrical wire is inserted, an opening portion from which the electrical wire is drawn out, and a vent portion which is impermeable to moisture and permeable to air. The second tubular body is provided to extend from the first tubular body and to cover an outer periphery of the electrical wire drawn from the opening portion, and is made of a material more flexible than a material of the first tubular body.

10 Claims, 6 Drawing Sheets

EXTERIOR MEMBER OF ELECTRICAL WIRE

CROSS REFERENCE TO RELATED APPLICATIONS

This application claims priority from Japanese Patent Application No. 2018-004385 filed on Jan. 15, 2018, the entire contents of which are incorporated herein by reference.

BACKGROUND OF THE INVENTION

Field of the Invention

The present invention relates to an exterior member through which an electrical wire may be inserted.

Description of Related Art

In the related arts, an exterior member may be attached to an electrical wire for protecting and waterproofing electrical wire (for example, refer to the patent document 1: JP-A-2010-215010, the patent document 2: JP-B-5737222, and the patent document 3: JP-A-2009-029423). For example, in a hybrid car or the like, a wire harness wired between a motor, an inverter, a battery or the like is generally wired to pass under the floor of a vehicle body. This type of wire harness may be inserted into the exterior member made of a hard material such as a metal pipe or the like, to screen electromagnetic noises emitted from the electrical wire constituting the wire harness, waterproof the electrical wire, and protect the electrical wire from external impacts, such as a stone (for example, refer to the patent document 1).
[Patent Document 1] JP-A-2010-215010
[Patent Document 2] JP-B-5737222
[Patent Document 3] JP-A-2009-029423

When using an exterior member, usually, to connect a connector or the like provided at an end part of a wire harness (electrical wire) to a predetermined electrical component while maintaining waterproofness or the like, a resin cover or the like is connected to an end part of a metal pipe to waterproof between the metal pipe and the electrical component. However, if a sealing property of the exterior member is raised to improve the waterproofness, when temperature inside the exterior member changes due to heat radiation from the electrical wire or the like and internal pressure changes, the flexible cover may be deformed and interfere with peripheral members, such that the cover is damaged. Such damage is undesirable as it may cause deterioration of the sealing property of the exterior member.

As a countermeasure against such deformation, in an exterior member of the related arts, there is a case where a pressure adjustment mechanism is provided to a waterproof cover (connector cover) made of soft material such as rubber and elastomer or a resin cover as described above covering a connector. However, in this case, dew condensation may occur inside the cover due to moisture in outside air introduced into the cover through the pressure adjustment mechanism. Therefore, it is undesirable to provide the pressure adjustment mechanism at a location covering electrical contact points like this kind of cover. It is also generally difficult to provide the pressure adjustment mechanism with no gap and made of a flexible material in this kind of cover while maintaining a sufficient sealing property.

SUMMARY

One or more embodiments provide an exterior member of an electrical wire that is able to prevent deterioration of waterproof performance or the like even when an internal pressure changes due to heat radiation from the electrical wire inserted through the exterior member or the like.

In an aspect (1), an exterior member of an electrical wire includes a first tubular body and a second tubular body. The first tubular body includes a hollow portion through which the electrical wire is inserted, an opening portion from which the electrical wire is drawn out, and a vent portion which is impermeable to moisture and permeable to air. The second tubular body is provided to extend from the first tubular body and to cover an outer periphery of the electrical wire drawn from the opening portion, and is made of a material more flexible than a material of the first tubular body.

In an aspect (2), the second tubular body is configured to watertightly cover the electrical wire between the opening portion and another member when a terminal of the electrical wire drawn from the opening portion is accommodated in the another member.

In an aspect (3), the first tubular body includes a flat surface portion on at least a part of a sidewall of the first tubular body. The vent portion is provided in the flat-surface portion.

In an aspect (4), the first tubular body is made of polypropylene or polyamide resin.

In an aspect (5), an exterior member for protecting a wire harness including an electrical wire which is wired to connect between an inverter and a battery, and a connector which is provided at least at one end of the electrical wire, the exterior member includes a first tubular body including a hollow portion through which the electrical wire is inserted and an opening portion from which the electrical wire is drawn out, and a second tubular body provided to extend from the first tubular body to cover an outer periphery of the connector provided at the electrical wire drawn from the opening portion. The first tubular body includes a vent portion which is impermeable to moisture and permeable to air.

According to the aspect (1), the exterior member includes the first tubular body and the second tubular body that is made of a material more flexible than a material of the first tubular body. When the exterior member is used to seal the electrical wire like the exterior member of the related arts described above, the more flexible second tubular body is deformed prior to the first tubular body when an internal pressure of the exterior member changes. The vent portion is provided in the first tubular body instead of the second tubular body that is easy to deform as described above. Therefore, compared with the case where the vent portion is provided in the more flexible second tubular body, deterioration of waterproof performance due to deformation of the vent portion itself (or a difference between amounts of deformation of the vent portion and surrounding members) may be prevented. For example, when a vent valve separate from the first tubular body is attached to the first tubular body to form the vent portion, looseness and the like due to the difference between amounts of the deformation of the vent valve and a part to which the vent valve is attached may be prevented. Therefore, the deterioration of the waterproof performance may be prevented.

When actually using the exterior member, instead of the second tubular body that covers an end part of the electrical wire, a connector or the like, the vent portion may be arranged at a desired location of the first tubular body separated from such electrical contacts. Therefore, there is no need to worry about dew condensation due to outside air introduced into the first tubular body through the vent portion.

Therefore, the exterior member of the above configuration may prevent the deterioration of the waterproof performance even when the internal pressure changes due to heat radiation from the electrical wire inserted through the exterior member or the like.

According to the aspect (2), while maintaining the state where the electrical wire is isolated from the surroundings for maintaining the waterproofness, the electrical wire drawn from the exterior member may be connected to the another member (for example, a connector).

According to the aspect (3), for example, when a vent valve separate from the second tubular body is attached to the first tubular body to form the vent portion, when providing a through hole for attaching the vent valve in the sidewall of the first tubular body, forming the through hole in a flat surface portion is easier than forming the through hole in a curved surface portion and facilitates improvement of watertightness. Therefore, while improving the waterproof performance of the exterior member, productivity may be improved.

According to the aspect (4), by configuring the first tubular body with polypropylene or polyamide resin, which is hard material of excellent workability, less thermal shrinkage, and, as an exterior member, sufficient strength against an assumed external force, convenience of the exterior member may be improved.

According to the aspect (5), the exterior member is used to insert therein the electrical wire wired to connect between the inverter and the battery. Therefore, when the vent portion is provided in the first tubular body between the battery and the inverter, the vent portion may be provided by selecting an appropriate location with less temperature change calculated through a thermal simulation during application of a current or the like. For example, when a vent valve separate from the first tubular body is attached to the first tubular body to form the vent portion, looseness and the like between the vent valve and a part to which the vent valve is attached due to a temperature change may be prevented. Therefore, deterioration of waterproof performance may be prevented.

When actually using the exterior member, instead of the second tubular body that covers an end part of the electrical wire or a connector, the vent portion may be arranged at a desired location of the first tubular body that is separated from such electrical contacts. Therefore, there is no need to worry about dew condensation due to outside air introduced into the first tubular body through the vent portion.

According to one or more embodiments, there may be provided an exterior member capable of preventing deterioration of waterproof performance or the like even when an internal pressure changes due to heat radiation from an electrical wire inserted through the exterior member or the like.

The present invention has been briefly described above. Furthermore, the details of the present invention will be further clarified by reading modes for carrying out the invention (hereinafter referred to as "embodiments") described below with reference to the attached drawings.

DETAILED DESCRIPTION

Embodiment

Hereinafter, an exterior member 1 according to an embodiment of the present invention will be described with reference to the drawings.

Figure 1:
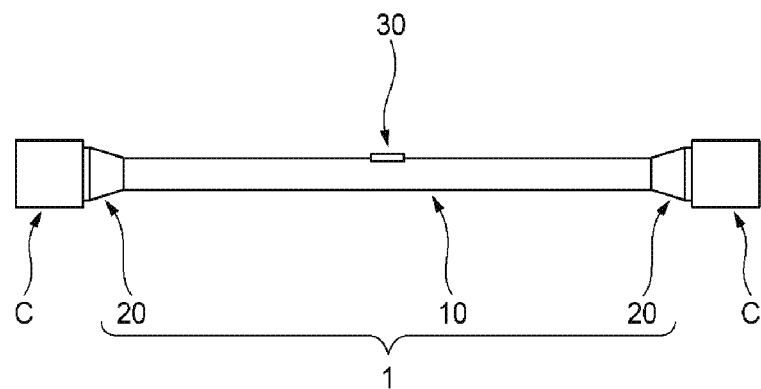
FIG. 1 is a side view of an entire electrical wire to which an exterior member according to an embodiment is attached.
Figure 2:
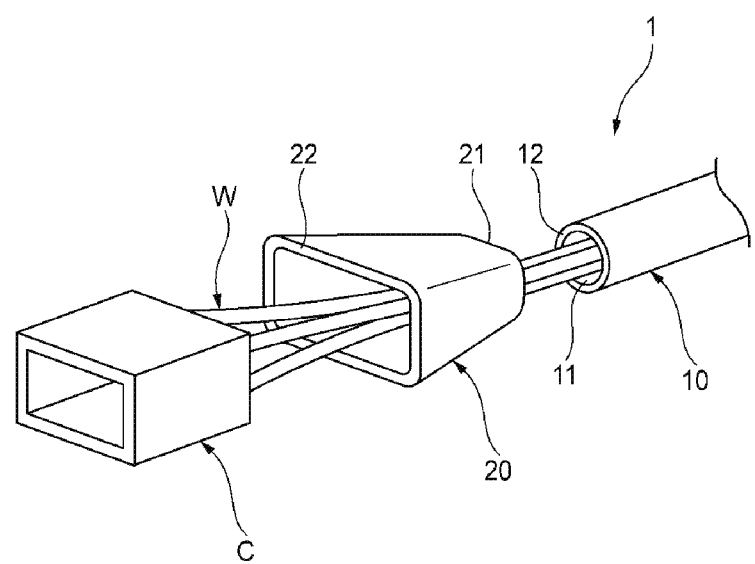
FIG. 2 is an exploded perspective view of the vicinity of one end part of the exterior member illustrated in FIG. 1.

As illustrated in FIGS. 1 and 2, an electrical wire W is inserted in a cylindrical exterior member 1 for purposes of protection, waterproofing and the like. The exterior member 1 includes an elongated first tubular body 10 and a pair of short second tubular bodies 20 fixed to both end parts of the first tubular body 10. As illustrated in FIG. 2, the second tubular body 20 is inserted to a hollow portion 11 of the first tubular body 10 (also refer to FIG. 4), such that the second tubular body 20 covers the outer periphery of the electrical wire W extended from the end part of the first tubular body 10 and pulled out from an opening portion 12 of the first tubular body 10.

In this example, the first tubular body 10 has a cylindrical shape and is typically a resin corrugated tube or a metal pipe. In this example, the second tubular body 20 has a shape that expands in diameter from one end part 21 toward another end part 22 and may also be referred to as a waterproof cover. The second tubular body 20 is made of a material (for example, an elastic body like rubber) that is more flexible than a material of the first tubular body 10 (for example, elastomer and metal).

Since a vent valve 30 described below is directly attached to the first tubular body 10, the material of the first tubular body preferably has excellent workability, resistance to thermal shrinkage, and, as the exterior member 1, sufficient strength against an assumed external force. For example, resin material such as polypropylene, polyamide resin, and an engineering plastic, is most preferable as the material of the first tubular body 10.

The electrical wire W is a bundle including a plurality of electrical wires. Alternatively, the electrical wire W may include a single electrical wire. Connectors C are connected to both end parts of electrical wire W, respectively. The one end part 21 of the second tubular body 20 is externally fitted to the end part of the first tubular body 10 and is airtightly and watertightly fixed in close contact with a tape or the like (not illustrated). The another end part 22 of the second tubular body 20 is externally fitted to an end part of the connector C on the electrical wire W side and is airtightly and watertightly fixed in close contact with a tape or the like (not illustrated). As a result, the exterior member 1 (the first tubular body 10+the pair of second tubular bodies 20) has an airtightly and watertightly sealed structure.

Figure 3A:
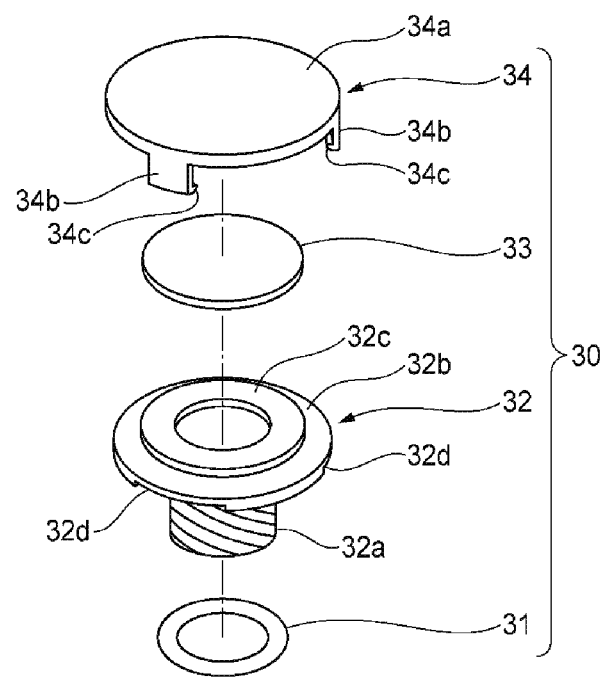
FIG. 3A is an exploded perspective view of a vent valve illustrated in FIG. 1.
Figure 3B:
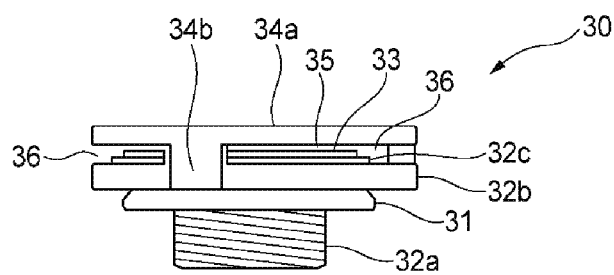
FIG. 3B is a side view of the vent valve after assembly.
Figure 4:
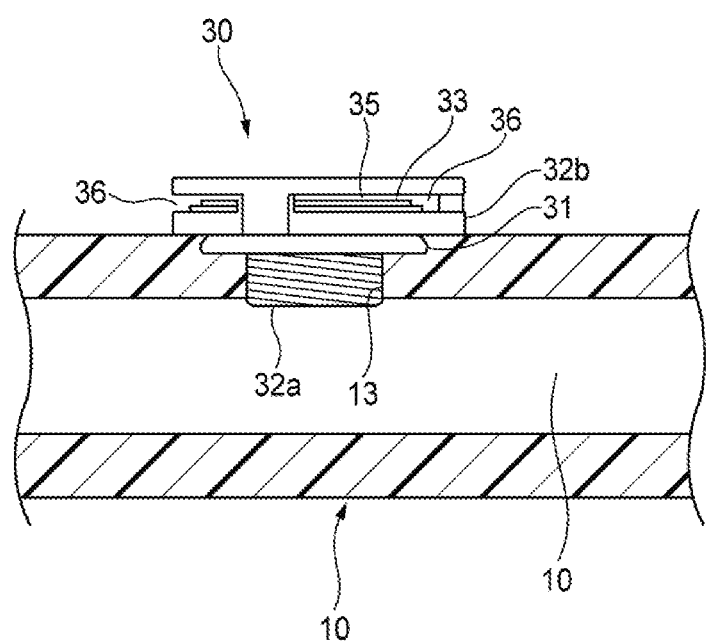
FIG. 4 is a cross-sectional view of a location of a first tubular body to which a vent valve is attached.

As illustrated in FIGS. 1 and 4, the vent valve 30 is attached to a center portion in a longitudinal direction of the first tubular body 10 using a through hole 13 (refer to FIG. 4) formed on a side surface of the first tubular body 10. The vent valve 30 is configured to be impermeable to moisture and permeable to air. Hereinafter, the structure of the vent valve 30 will be briefly described with reference to FIGS. 3A and 3B.

As illustrated in FIGS. 3A and 3B, the vent valve 30 includes a rubber ring 31, a supporting unit 32, a vent film 33, and a cover 34. The supporting unit 32 is made of resin and includes a cylindrical portion 32a, an annular flange portion 32b coaxially provided at an upper end of the cylindrical portion 32a and protruded outwardly in a radial direction, and an annular fixing portion 32c coaxially provided on a top surface of the flange portion 32b and protruded slightly upward. In the supporting unit 32, a through hole penetrating therethrough in a vertical direction is coaxially formed. Notches 32d are formed at a plurality of locations in the circumferential direction of the flange portion 32b (three locations in this example).

The vent film 33 is a film having a disk-like shape, being impermeable to the moisture, and permeable to the air. As the vent film 33, typically, a porous body of polytetrafluoroethylene (PTFE) of fluorine resin is used. However, other porous bodies, woven fabrics, nonwoven fabrics, nets, foams and the like may also be used. To increase the strength of the vent film 33, it is also preferable to employ a structure in which reinforcing layers, such as woven fabrics, nonwoven fabrics, nets, foams and the like, are stacked.

The cover 34 is made of resin and includes a disk-like portion 34a and locking pieces 34b extending downward from a plurality of locations of the outer edge of the disk-like portion 34a in a circumferential direction (three locations in this example). A locking claw 34c is formed at the distal end part of the locking piece 34b.

The rubber ring 31 is inserted in the cylindrical portion 32a of the supporting unit 32 and fixed to an end part of the cylindrical portion 32a on the flange portion 32b side. The edge portion of the vent film 33 is adhered to an annular top surface (flat surface) of the fixing portion 32c of the supporting unit 32. This adhesion is performed by heat welding, ultrasonic welding, an adhesive or the like.

With the vent film 33 adhered to the supporting unit 32, the locking claws 34c of the locking pieces 34b of the cover 34 are respectively locked to the corresponding notches 32d of the supporting unit 32, and thus the cover 34 is attached to the supporting unit 32. As illustrated in FIG. 3B, when the cover 34 is attached to the supporting unit 32, a minute gap 35 is formed between a top surface of the vent film 33 and a bottom surface of the disk-like portion 34a of the cover 34. As a result, the air may pass through the through hole inside the supporting unit 32, the vent film 33, the gap 35, and a gap 36 between the locking pieces 34b adjacent to each other.

As illustrated in FIG. 4, the vent valve 30 assembled to the first tubular body 10 is inserted into the through hole 13 of the first tubular body 10 by inserting the cylindrical portion 32a of the supporting unit 32 into the through hole 13 of the first tubular body 10 and adhering the supporting unit 32 onto the side surface of the first tubular body 10, such that the rubber ring 31 closely contacts the vicinity of the outer edge of the through hole 13 of the first tubular body 10 over the entire circumference. Therefore, the vent valve 30 may be attached to the first tubular body 10.

As a result, when the internal pressure changes by a temperature change due to heat radiation of the electrical wire W or the like inside the sealed structure of the exterior member 1 (the first tubular body 10+the pair of second tubular bodies 20), the air may flow between inside and outside of the sealed space via the vent valve 30. As described above, the vent valve 30, which is separate from the second tubular body 20, is attached to the through hole 13 of the first tubular body 10, thereby constituting a "vent portion" of the present invention.

As described above, according to the exterior member 1 according to an embodiment of the present invention, the exterior member 1 includes the first tubular body 10 and the second tubular body 20 made of a material more flexible than the first tubular body 10. When the internal pressure of the exterior member 1 changes, the more flexible second tubular body 20 will be deformed prior to the first tubular body 10. Here, the vent valve 30 is provided in the first tubular body 10 instead of the second tubular body 20 that may be easily deformed as described above.

Therefore, compared with the case where the vent valve 30 is provided in the second tubular body 20, looseness or the like due to deformation hardly occurs between the vent valve 30 and a location to which the vent valve 30 is attached (the through hole 13). Therefore, deterioration of the watertightness of the vent valve 30 itself due to the deformation may be prevented, and the deterioration of the waterproof performance of exterior member 1 may be prevented. Therefore, the exterior member 1 may prevent the deterioration of the waterproof performance even when the internal pressure changes due to heat radiation from the electrical wire W inserted through the exterior member 1 or the like.

The second tubular body 20 is configured to watertightly cover the electrical wire W between the opening portion 12 of the first tubular body 10 and the connector C. As a result, the watertightness between the exterior member 1 and the connector C may also be improved.

Other Embodiments

It should be noted that the present invention is not limited to the above embodiments, and various modifications may be made therein within the scope of the present invention. For example, the present invention is not limited to the above-described embodiment, but may be appropriately modified and improved. Materials, shapes, dimensions, numbers, arrangement locations, and the like of each constituent element in the above-described embodiment are arbitrary as far as the present invention may be implemented and are not limited.

Figure 5A:
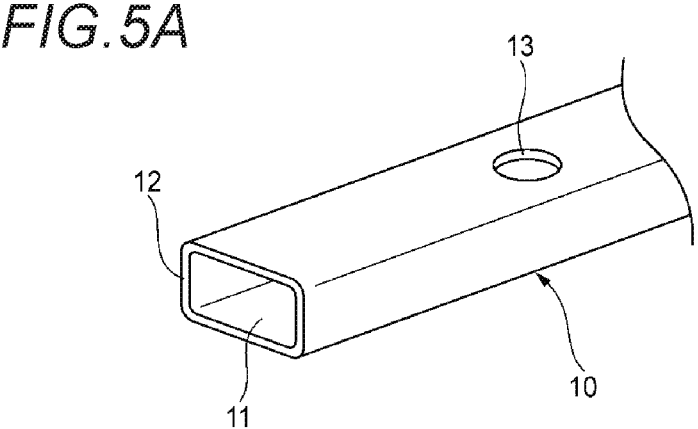
FIG. 5A is a perspective view of a periphery of a through hole of a first tubular body for attaching a vent valve according to a modified example of an embodiment.

For example, in the above embodiment, the first tubular body 10 has a cylindrical shape. On the other hand, as illustrated in FIG. 5A, the first tubular body 10 may have a rectangular tubular shape. Therefore, the through hole 13 of the first tubular body 10 may be formed on a flat surface portion of a sidewall of the first tubular body 10. As a result, processing of the through hole 13 is further facilitated, and the watertightness may be easily improved.

Figure 5B:
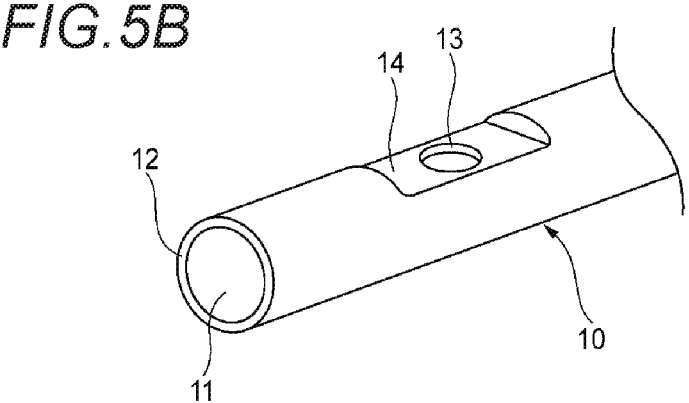
FIG. 5B is a perspective view of the periphery of the through hole of the first tubular body for attaching the vent valve according to another modified example of the embodiment.

Even when the first tubular body 10 has a cylindrical shape, as illustrated in FIG. 5B, a flat surface portion 14 may be provided on a part of the side surface of the first tubular body 10, and the through hole 13 may be formed in the flat surface portion 14. With this arrangement, since the vent valve 30 is attached to the flat surface portion 14, processing of the through hole 13 is further facilitated, and the watertightness may be easily improved.

In the above embodiment, the vent valve 30 is attached only to the center portion of the first tubular body 10 in the longitudinal direction. However, the vent valve 30 may be attached to a plurality of positions of the first tubular body 10 in the longitudinal direction.

In the above embodiment, the vent valve 30 is provided as a member separate from the first tubular body 10. However, a member having a function corresponding to that of the vent valve 30 may be provided integrally with the first tubular body 10 (for example, by insertion molding).

Figure 6:
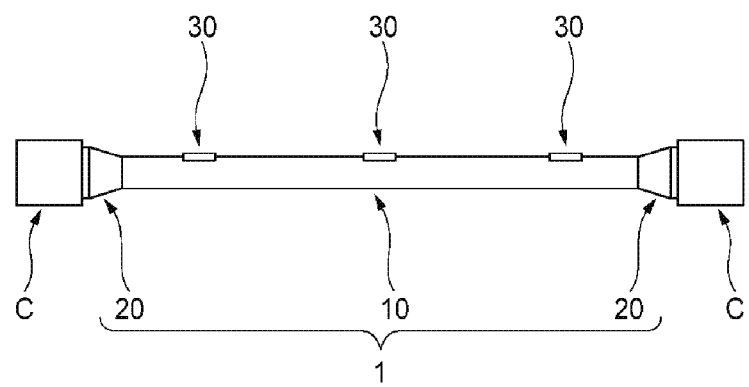
FIG. 6 is a side view of an entire electrical wire to which an exterior member according to another embodiment is attached.

In the above embodiment, one vent valve 30 is provided for one exterior member 1. However, as illustrated in FIG. 6, a plurality of vent valves 30 may be provided for one exterior member 1.

Figure 7:
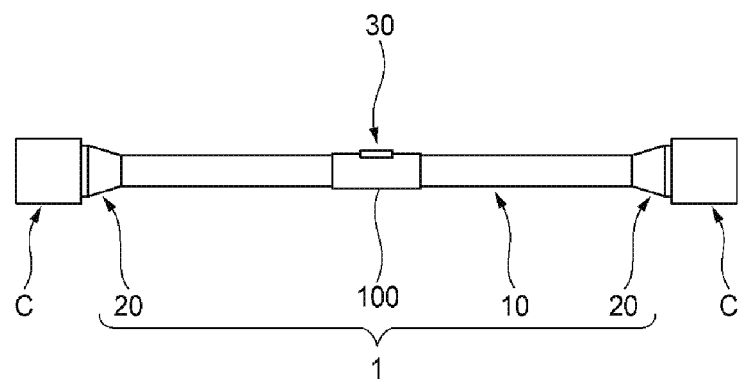
FIG. 7 is a side view of an entire electrical wire to which an exterior member according to another embodiment is attached.

In the above embodiment, the exterior member 1 includes a single first tubular body 10. However, as illustrated in FIG. 7, the exterior member 1 may include a plurality of first tubular bodies 10 such that the first tubular bodies 10 sandwich a tubular body 100 with vent film provided with the vent valve 30. In this case, the first tubular body 10 and the tubular body 100 with vent film are preferably made of same materials. When the first tubular body 10 and the tubular body 100 with vent film are made of different materials, the first tubular body 10 and the tubular body 100 with vent film may be formed of materials with similar thermal expansion coefficients.

Application Example

Figure 8:
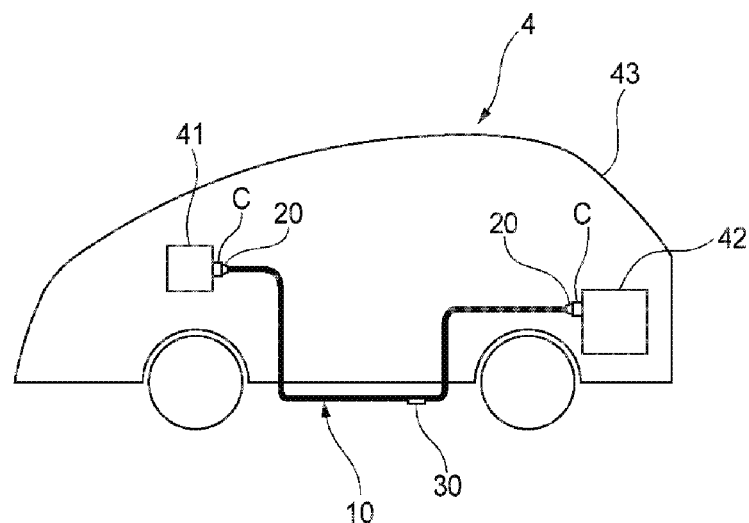
FIG. 8 is a schematic diagram illustrating a state in which an electrical wire to which an exterior member according to an embodiment is attached is wired in a vehicle.

An application example of the exterior member 1 will be described with reference to FIG. 8. FIG. 8 illustrates a state of the exterior member 1 according to an embodiment of the present invention being applied to a vehicle 4.

As illustrated in FIG. 8, the vehicle 4 includes a battery 41 arranged at a front portion of a vehicle body 43 and an inverter 42 arranged at a rear portion of the vehicle body 43. In the exterior member 1, a wire harness (electrical wire) wired to connect between the battery 41 and the inverter 42 is inserted. Specifically, the first tubular body 10 of the exterior member 1 is configured to cover and protect the wire harness (electrical wire). The connectors C connected to the battery 41 and the inverter 42 are provided at both ends of the wire harness, and the periphery of the connector C is covered by the second tubular body 20 (also refer to FIG. 1).

The vent valve 30 is provided at a substantially center portion of the first tubular body 10 of exterior member 1 wired in this manner. In other words, in this example, the vent valve 30 is provided outside a cabin.

Figure 9:
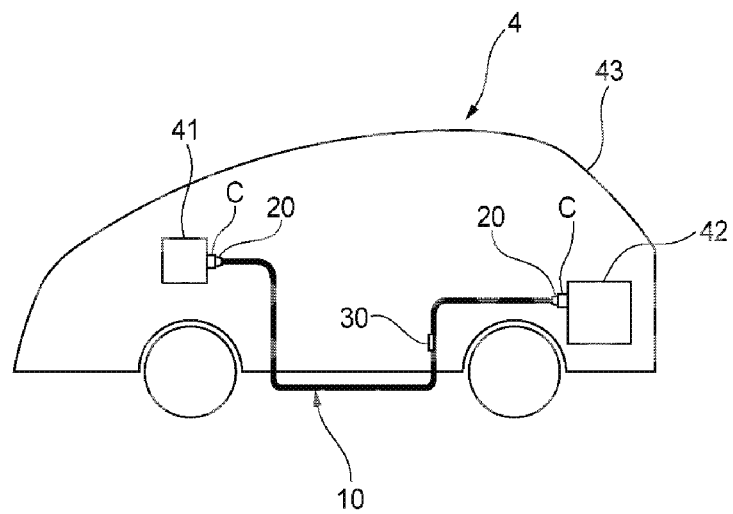
FIG. 9 is a schematic diagram illustrating another state in which an electrical wire to which an exterior member according to an embodiment is attached is wired in a vehicle.

However, the vent valve 30 does not necessarily need to be provided outside the cabin. As illustrated in FIG. 9, the vent valve 30 may be provided inside the cabin. In this case, it is more preferable to provide the vent valve 30 in a place where temperature change is small and thermal expansion and thermal contraction of the first tubular body 10 hardly occurs.

Here, the features of the embodiments of the exterior member 1 according to the present invention are summarized briefly in the following (1) to (5).
(1) An exterior member (1) of an electrical wire (W) comprising:
a first tubular body (10); and
a second tubular body (20),
wherein the first tubular body (10) includes a hollow portion (11) through which the electrical wire (W) is inserted, an opening portion (12) from which the electrical wire (W) is drawn out, and a vent portion (30) which is impermeable to moisture and permeable to air, and
wherein the second tubular body (20) is provided to extend from the first tubular body (10) and to cover an outer periphery of the electrical wire (W) drawn from the opening portion, and is made of a material more flexible than a material of the first tubular body (10).
(2) The exterior member (1) according to (1),
wherein the second tubular body (20) is configured to watertightly cover the electrical wire (W) between the opening portion (12) and another member (C) when a terminal of the electrical wire (W) drawn from the opening portion (12) is accommodated in the another member (C).
(3) The exterior member (1) according to (1) or (2),
wherein the first tubular body (10) includes a flat surface portion on at least a part of a sidewall of the first tubular body (10), and
wherein the vent portion (30) is provided in the flat-surface portion.
(4) The exterior member (1) according to any one of (1) to (3),
wherein the first tubular body (10) is made of polypropylene or polyamide resin.
(5) An exterior member (1) for protecting a wire harness including an electrical wire (W) which is wired to connect between an inverter (42) and a battery (41), and a connector (C) which is provided at least at one end of the electrical wire (W), the exterior member (1) comprising:
a first tubular body (10) including a hollow portion (11) through which the electrical wire (W) is inserted and an opening portion (12) from which the electrical wire (W) is drawn out; and
a second tubular body (20) provided to extend from the first tubular body (10) to cover an outer periphery of the connectors (C) provided at the electrical wire (W) drawn from the opening portion,
wherein the first tubular body (10) includes a vent portion (30) which is impermeable to moisture and permeable to air.

DESCRIPTION OF REFERENCE NUMERALS AND SIGNS

1: exterior member
10: first tubular body
11: hollow portion
12: opening portion
20: second tubular body
30: vent valve (vent portion)
C: connector (another member)
W: electrical wire

What is claimed is:
1. An exterior member of an electrical wire comprising:
a first tubular body;
a pair of second tubular bodies; and
a vent portion,
wherein the first tubular body includes a hollow portion through which the electrical wire is inserted, an opening portion at each end from which the electrical wire is drawn out, and a through hole on a side surface of the first tubular body,
wherein the vent portion is attached to the first tubular body via the through hole, the vent portion configured to be impermeable to moisture and permeable to air, wherein each of the second tubular bodies is provided to extend from a different end of the first tubular body and to cover an outer periphery of the electrical wire drawn from the opening portion at each end of the first tubular body, and is made of a material more flexible than a material of the first tubular body, and wherein the vent portion includes a rubber ring, a supporting unit, a vent film, and a cover, wherein the first tubular body includes a flat surface portion on at least a part of a sidewall of the first tubular body, the flat surface portion including a circumference of the through hole, and wherein the vent portion is attached to the flat surface portion.

2. The exterior member according to claim 1,
wherein at least one of the second tubular bodies is configured to watertightly cover the electrical wire between the opening portion and another member when a terminal of the electrical wire drawn from the opening portion is accommodated in the other member.

3. The exterior member according to claim 1,
wherein the first tubular body is made of polypropylene or polyamide resin.

4. An exterior member for protecting a wire harness including an electrical wire which is wired to connect between an inverter and a battery, and a connector which is provided at least at one end of the electrical wire, the exterior member comprising:

a first tubular body including a hollow portion through which the electrical wire is inserted, an opening portion, at each end of the first tubular body, from which the electrical wire is drawn out, and a through hole on a side surface of the first tubular body;

a pair of second tubular bodies, each of the second tubular bodies provided to extend from a different end of the first tubular body to cover an outer periphery of the connector provided at the electrical wire drawn from the opening portion; and a vent portion attached to the first tubular body via the through hole, and configured to be impermeable to moisture and permeable to air, and wherein the vent portion includes a rubber ring, a supporting unit, a vent film, and a cover, wherein the first tubular body includes a flat surface portion on at least a part of a sidewall of the first tubular body, the flat surface portion including a circumference of the through hole, and wherein the vent portion is attached to the flat surface portion.

5. The exterior member according to claim 1, wherein the supporting unit is made of resin and includes a cylindrical portion, an annular flange portion coaxially provided at an upper end of the cylindrical portion and protruded outwardly in a radial direction, and an annular fixing portion coaxially provided on a top surface of the flange portion and protruded upward.

6. The exterior member according to claim 1, wherein the through hole is coaxially formed and penetrates through the supporting unit in a vertical direction.

7. The exterior member according to claim 5, wherein the flange portion includes a plurality of notches in a circumferential direction.

8. The exterior member according to claim 4, wherein the supporting unit is made of resin and includes a cylindrical portion, an annular flange portion coaxially provided at an upper end of the cylindrical portion and protruded outwardly in a radial direction, and an annular fixing portion coaxially provided on a top surface of the flange portion and protruded upward.

9. The exterior member according to claim 4, wherein the through hole is coaxially formed and penetrates through the supporting unit in a vertical direction.

10. The exterior member according to claim 8, wherein the flange portion includes a plurality of notches in a circumferential direction.

* * * * *